United States Patent [19]
Bergkvist

[11] 3,766,553
[45] Oct. 16, 1973

[54] DEVICE IN A SEARCH RADAR EQUIPMENT
[75] Inventor: Bengt Bergkvist, Jakobsberg, Sweden
[73] Assignee: U.S. Philips Corporation, New York, N.Y.
[22] Filed: Apr. 5, 1972
[21] Appl. No.: 241,334

[30] Foreign Application Priority Data
Apr. 15, 1971 Sweden.............................. 4876/71

[52] U.S. Cl. ................................. 343/7.7, 343/5 R
[51] Int. Cl. ........................................... G01s 9/42
[58] Field of Search ............................ 343/5 R, 7.7

[56] References Cited
UNITED STATES PATENTS
2,954,554  9/1960  Feltham .......................... 343/5 R X
3,680,096  7/1972  Bosc ................................... 343/7.7

Primary Examiner—T. H. Tubbesing
Attorney—Frank R. Trifari

[57] ABSTRACT

A pulse radar equipment comprising a repeatedly triggered transmitter tube cooperating with antenna means for repeated transmission of radar pulses and receiver means for reception of echo pulses caused by energy reflected from targets in the direction of the transmitted pulses and further comprising a detector which is sensitive for absence of transmitted pulse after triggering of the tube or for a transmitted pulse having an amplitude below a given threshold level and adapted to block the receiver means during echo intervals following such missing or reduced pulse.

2 Claims, 1 Drawing Figure

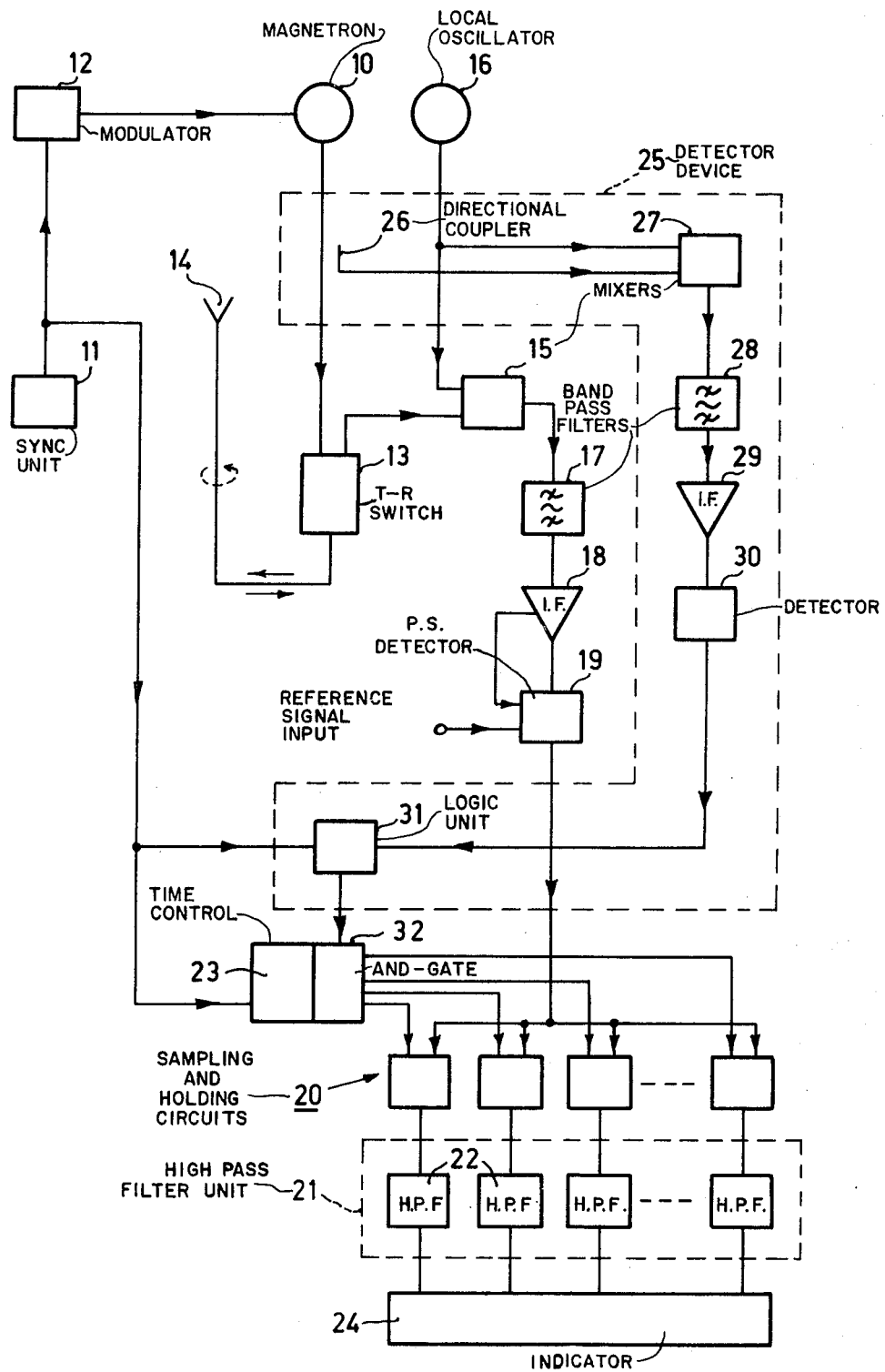

DEVICE IN A SEARCH RADAR EQUIPMENT

The invention relates to a device in a search radar equipment comprising a transmitter tube with means for repeated excitation of the tube and cooperating with an antenna which makes a sweeping scanning motion across a target space for transmitting radar pulses in different directions into the target space and means for reception of echo pulses caused by energy reflected from targets in the direction of the transmitted pulses. The echo pulses after combination with a local oscillator frequency from a local oscillator are led to a filter unit containing high pass filters, so called doppler filters, adapted to suppress the echo response from such targets which due to a constant distance (ground targets) or a low mutual speed between the radar equipment and the targets give rise to echo pulses with from pulse to pulse unchanged amplitude or, alternatively, with a variable amplitude having a low frequency of the amplitude variations; the doppler filters, however, are adapted to pass the echo response from such targets which due to a relatively high mutual speed between the target and the radar equipment give rise to echo pulses having an amplitude variation of a higher frequency. The doppler filters are made effective in successive order as counted from the transmission moment for each radar pulse and are kept in active condition during a short interval corresponding to a distance region in the target space, i.e., the output signal from each filter originates from a certain distance zone. A desire is that not only echo pulses from still standing targets but also echo pulses from slowly moving targets, for example reflecting strips, are to be suppressed by the filters which, therefor, must have a relatively large suppression frequency band width. Only targets which give rise to a variation in the amplitude of the echo pulses having a frequency, the so called doppler frequency, which lies above the limit frequency for the filters will produce a signal at the output of the respective filter and can be discovered. If the velocity of a target is so high that the doppler frequency caused thereby is equal to the pulse repetition frequency, however, if will occur that the sampled signal applied to the input of the filter will have a constant amplitude and apparently will correspond to a stillstanding target and the echo reply will thus be suppressed. The speed of this phenomenon is called "blind" speed. A number of blind speed ranges can be present corresponding to doppler frequencies, which are different multiples of the pulse repetition frequency. The width of the blind speed ranges is proportional to the double suppression bandwidth of the employed high pass filters. A wide suppression band which is desirable in order to suppress the echo reply from slowly moving target, such as reflecting strips, will thus at the same time give rise to large blind speed ranges. In order that the blind speed ranges be not larger than those as required with regard to the desired width of the suppression band it is necessary that the flanks of the filter characteristic be steep, which involves an increased complexity of the filters. A filter with steep flanks has also an extended step function response, so that it will be blocked during a long interval after the moment when a transient disturbance has appeared at the input of the filter. A strong transient disturbance occurs in the case when at transmission against a large ground target resulting in strong echo pulses back against the radar equipment under simultaneous sweeping motion of the transmitting antenna, the magnetron suddenly omits to transmit a pulse. The echo reply has successively increased during the sweep across the ground target and a strong signal has been built-up at the input of the filter. An inhibited pulse then will involve that the amplitude suddenly decreases to near zero, which process is equivalent with the applying of a strong voltage pulse. If no measures were taken this would cause that the filter would be ineffective during a long interval after the disturbance when using filters having steep flanks.

The invention eliminates the said drawbacks and makes it possible to use a filter with an extended step function response (steep flanks). In principle the above object is achieved thereby that a detector is arranged which is sensitive to the transmitted high frequency pulses and at the absence of a high frequency pulse after triggering or at transmission of a high frequency pulse with an amplitude below a certain threshold level will influence blocking means so that said blocking means will prevent the "echo reply" to reach the doppler filters during echo intervals following after the omitted or reduced pulse. Both digital and analogue filters can be used. In the case of digital filters the blocking will involve that the sampling is inhibited while in case of analogue filters the input signal is maintained by means of a holding circuit on a signal amplitude measured during the foregoing pulse.

The invention is illustrated in the accompanying drawing which shows a simplified block diagram for a device realizing the principles of the invention.

In the drawing reference numeral 10 designates a magnetron which is triggered with a certain repetition frequency from a sync unit 11 via a modulator 12. The produced HF-pulses pass through a TR switch 13 to an antenna 14 which transmits the pulses. The antenna is assumed to rotate about a vertical axis so that the transmitting lobe will make a sweeping motion in the horizontal plane. The antenna also serves for receiving energy reflected from targets in the direction of the transmitted energy. The reflected energy (echo pulses) is led by the TR switch 13 to a mixer 15 in which it is combined with a local oscillator frequency from a local oscillator 16 for generating an intermediate frequency signal. The intermediate frequency signal comprising the echo pulses is filtered-out by means of a band pass filter 17 and amplified in an intermediate frequency amplifier 18. The amplified echo pulses at intermediate frequency are then passing to a phase sensitive detector 19 which receives reference voltage from a reference oscillator. The phase sensitive detector 19 delivers a bipolar video signal which through sampling and holding circuits 20 is led to a filter unit 21 comprising a large number of high pass filters 22. The high pass filters are activated in successive order in accurately determined time zones as counted from the transmission moment by means of control pulses from a device which in the drawing is schematically indicated by the block 23. The output signals from the respective filter are finally indicated on an indicator 24.

In the high pass filters included in the filter unit 21 all echo pulse signals with from pulse to pulse unchanged amplitude and also echo pulse signals in which the amplitude varies slowly will be suppressed. In the contrary echo pulse signals with an amplitude modulation of higher frequency are passed by the respective filter. Furthermore the filters will suppress such signals, the modulation frequency of which is a multiple of the pulse repetition frequency corresponding to blind speed ranges for the reflecting targets. In order to make the blind speed ranges as small as possible under maintaining a wide suppression band the filters are formed by a type having a very steep flank of the frequency characteristic. The filters are assumed in the present case to be of digital type, for example Cauer-filter of fourth order, having a step function reply of 8–10 ms, but can if desired also be of analogue type.

In order to avoid that transients will enter the filters if the magnetron of some reason should not deliver any pulse in spite of triggering there is according to the invention arranged a detector device, in the drawing generally designated with 25, which is sensitive for absence of pulse after excitation of the magnetron and in this case blocks the input signal to the doppler filters. The detector device comprises a directional coupler 26 which leads a portion of the power of the transmitted pulse to a mixer 27 in which it is combined with the local oscillator frequency from the local oscillator 16. The mixing product representing an intermediate frequency signal is filtered by a band pass filter 28 and amplified in an intermediate frequency amplifier 29 and thereafter led to a detector 30. From the detector a video pulse is obtained which is led another one input of a logic unit 31 which at anothe input receives the sync pulse from the sync unit 11. The logic unit 31 is shaped such that it delivers output signal if sync pulse from the sync unit is not followed by video signal from the detector 30 within for example about 4 µs. The output signal from the logic unit 31 indicating that any pulse has not been transmitted from the magnetron is led to AND-gates 32 arranged in the connection lines between the control unit 23 and the sampling and holding circuits 20 and will cause blocking of the control pulses from the control unit. Inhibited control pulse from the control unit involves in the case of digital filters that the sampling will be inhibited, while in case of analogue filters the input signal is maintained upon a signal level measured during the foregoing pulse by means of holding circuits. The signal from the logic unit 31 may for example have a duration corresponding to the time interval between two pulses, whereby the filter unit is blocked during the whole echo interval after an omitted pulse.

What is claimed is:

1. A device in a radar equipment comprising a transmitter tube (10) with means for repeated excitation of the tube and cooperating with an antenna (14) for transmission of radar pulses and means (13–19) for reception of echo pulses caused by energy reflected from targets in the direction of the transmitted pulses, which pulses are evaluated in a treating unit, characterized by a detector device (25) which is sensitive for the amplitude of the transmitted high frequency pulses and at absence of high frequency pulse after triggering or at transmission of a high frequency pulse with an amplitude below a certain threshold level will influence blocking means (32) for bringing the same to prevent the "echo reply" from reaching the treating unit during echo intervals following after an omitted or reduced pulse.

2. A device as claimed in claim 1, characterized in that the treating unit comprises a filter unit (21) with doppler filters (22) in the shape of high pass filters, suitably with steep flanks in the filter characteristic, which filters suppress the echo reply from such targets which due to constant distance or low mutual speed between the radar equipment and the target will give rise to echo pulses having from pulse to pulse unchanged amplitude or pulses with a low frequency on the amplitude variations, respectively, but will pass the echo reply from targets which due to a relatively high mutual speed between target and radar equipment will give rise to an amplitude variation in the echo pulses of higher frequency, the said blocking means (32) being arranged before the filter unit (21).

* * * * *

UNITED STATES PATENT OFFICE
CERTIFICATE OF CORRECTION

Patent No. 3,766,553         Dated October 16, 1973

Inventor(s) BENGT BERGKVIST

It is certified that error appears in the above-identified patent and that said Letters Patent are hereby corrected as shown below:

In the Claims: rewrite Claims 1 and 2 to read as follows:

1. A device in a radar equipment comprising a transmitter tube with means for repeated excitation of the tube and cooperating with an antenna for transmission of radar pulses and means for reception of echo pulses caused by energy reflected from targets in the direction of the transmitted pulses, which echo pulses are evaluated in a treating unit, characterized by a detector device which is sensitive to the amplitude of the transmitted high frequency pulses and at the absence of a high frequency pulse after triggering or a transmission of a high frequency pulse with an amplitude below a certain threshold level will activate blocking means operable to prevent the "echo reply" from reaching the treating unit during echo intervals following after an omitted or reduced pulse.

2. A device as claimed in claim 1, characterized in that the treating unit comprises a filter unit with doppler filters in the shape of high pass filters, suitably with steep flanks in the filter characteristic, which filters suppress the echo reply from such targets which due to constant distance or low mutual speed between the radar equipment and the target will give rise to echo pulses having from pulse to pulse unchanged amplitude or pulses with a low frequency on the amplitude variations, respectively, but will pass the echo reply from targets which due to a relatively high mutual speed between target and radar equipment will give rise to an amplitude variation in the echo pulses of higher frequency, the said blocking means being arranged before the filter unit.

Signed and sealed this 6th day of August 1974.

(SEAL)
Attest:

McCOY M. GIBSON, JR.
Attesting Officer

C. MARSHALL DANN
Commissioner of Patents